United States Patent
Braglia

[11] Patent Number: 5,991,486
[45] Date of Patent: Nov. 23, 1999

[54] ACTIVE SINGLE MODE OPTICAL FIBRES AND METHOD FOR THEIR FABRICATION

[75] Inventor: Marco Braglia, Turin, Italy

[73] Assignee: Cselt- Centro Studi E Laboratori Telecomunicazioni S.p.A., Turin, Italy

[21] Appl. No.: 08/962,371

[22] Filed: Oct. 31, 1997

[30] Foreign Application Priority Data

Nov. 19, 1996 [IT] Italy ................................. T096A0927

[51] Int. Cl.$^6$ ...................................................... G02B 6/16
[52] U.S. Cl. .......................... 385/123; 385/142; 385/144; 65/475
[58] Field of Search .................................... 385/123, 141, 385/142, 144; 65/385, 389, 475, 477

[56] References Cited

U.S. PATENT DOCUMENTS

| | | | |
|---|---|---|---|
| 3,901,996 | 8/1975 | Hasegawa et al. | 428/426 |
| 4,372,767 | 2/1983 | Maklad | 65/3.12 |
| 4,908,053 | 3/1990 | Nishii et al. | 65/3.11 |
| 4,938,562 | 7/1990 | Vacha et al. | 350/96.34 |

FOREIGN PATENT DOCUMENTS

| | | |
|---|---|---|
| 0 716 048 A1 | 11/1995 | European Pat. Off. . |
| 870068105 | 3/1987 | Japan . |
| 04031333 | 2/1992 | Japan . |

OTHER PUBLICATIONS

Xth International Symposium on Non–Oxide Glasses, June 19–22–96, Corning,NY,USA; "Rare–earth–doped Multicomponent Ge–based Sulphide Glasses",pp.302–307, Bruce G Aitken.

Fiber Optic Communications Handbook, (Technical Staff of CSELT), "Special Fibers and other Fiber Fabrication processes". 9 pages. (1990).

*Primary Examiner*—John D. Lee
*Assistant Examiner*—Juliana K. Kang
*Attorney, Agent, or Firm*—Herbert Dubno

[57] ABSTRACT

An active single-mode optical fiber has the core made of a rare earth doped non-oxide glass and the cladding made of an oxide glass. The glass of the core has a melting temperature lower than that of the glass of the cladding and lying within the range of the softening temperatures of the latter. In a preferred embodiment the core is made of a chalcogenide glass and the cladding is made of a lead silicate glass. To produce the fiber, a preform, obtained by introducing an element made of the non-oxide glass into the hole of a capillary tube made of the oxide glass, is brought to a temperature lying within the range of softening temperatures of the oxide glass and not lower than the melting temperature of the non-oxide glass, and is drawn. The capillary tube, during the drawing process, serves as a container for the molten glass of the core.

9 Claims, 1 Drawing Sheet

ACTIVE SINGLE MODE OPTICAL FIBRES AND METHOD FOR THEIR FABRICATION

FIELD OF THE INVENTION

The present invention relates to optical components for optical communication systems and, more particularly, to an active single-mode optical fiber with a non-oxide glass core and to a method of producing this optical fiber.

BACKGROUND OF THE INVENTION

Optical fiber communication systems increasing make use of optical amplifiers to compensate the attenuation of the transmitted signals resulting from propagation along the fiber, in order to avoid the need for optical/electrical conversions, and vice versa, in the repeaters. Those optical amplifiers in general comprise a section of rare earth doped optical fiber which the signal to be amplified and a pump signal, at a different wavelength, are sent. The most commonly used optical amplifiers use as the active fiber a silica fiber, doped for instance with erbium. These amplifiers operate on signals whose wavelength lies in the third transmission window (around 1.55 $\mu$m) and require the use of sources at that wavelength. However, silica fibers, which are the most commonly used carriers in optical communication systems, have essentially zero dispersion in the second transmission window (wavelengths around 1.3 $\mu$m), while in the third window their dispersion is high (in the order of 15–20 ps/nm·km). For high bit rate transmissions over long distances, this fact compels introducing into the system means for compensating the chromatic dispersion, which make the communication system complex and costly.

Optical amplifiers operating in the second transmission window have already been proposed: they use fibers made of non-oxide glass, in particular fluoride glasses, aluminium-fluoride glasses or chalcogenide glasses, doped with rare earth metals.

The drawback of optical fibers made of non-oxide glass is that their mechanical and chemical inertia characteristics are worse than those of silica fibers (or, in general, of oxide glass fibers. Moreover, the fabrication process can also cause quality problems, since the mechanical and optical characteristics of those fibers are closely linked with the "thermal history" of the glass from which the fiber is formed and, more particularly, with the number of operations which require heating the glass to a temperature exceeding the glass transition temperature, since such operations may give rise to crystallization or devitrification of the glass matrix.

To avoid the problems connected with the thermal history of the glass, it has been proposed to produce non-oxide fibers by the "double crucible" method. See paragraphs 2.3.2 "Double crucible method" and 2.3.8 "MIR (medium-infrared fibers)" of the book "Fiber Optics Communications Handbook", by the Technical Staff of CSELT, published by TAB Professional and Reference Books, Blue Ridge Summit, Pa., USA, 2nd edition, 1990. This method, however, has problems in controlling the quality of the interface between the cladding and the core glasses, can cause the inclusion of gas bubbles in the fiber and, above all, very difficult to apply in practice when single mode active fibers (whose core diameter must be in the order of 1–2·mm) are to be obtained, for reasons linked with the control of the geometric dimensions of the output hole of the inner crucible.

OBJECT OF THE INVENTION

According to the invention it is an object of the invention to provide an active fiber and a method for its fabrication which obviate the drawbacks described above.

SUMMARY OF THE INVENTION

According to the invention a single mode active fiber is provided whose core is made of a rare earth doped, non-oxide glass, wherein the cladding is made of an oxide glass and wherein, furthermore, the core is made of a glass whose melting temperature is lower than that of the cladding glass and lies within the range of softening temperatures of the latter.

The term "range of softening temperatures" means, in this description, the temperature range between the glass transition temperature Tg (where the glass has a viscosity of $10^{12}$ Pa·s) and the temperature at which the glass has a viscosity of $10^4$ Pa·s (viscosity at which the "gob" falls down by gravity and the fiber can be drawn with minimum force).

A fiber of this kind eliminates the mechanical resistance and chemical inertia problems of fibers completely made of non-oxide glass, since the cladding (which makes up most of the material of the single mode fiber) is made of an oxide glass. Moreover, the aforesaid glasses can be active both in the second window (if doped with Pr and Dy) and in the third window (if doped with Er) and in this latter case, as is well known, they have a broader and flatter amplification band than oxide glasses.

Important aspects to be taken into account in choosing the two glasses to be used in a fiber of this kind are given by the thermal expansion coefficient and by the refractive index of the glasses themselves. Specifically, the two glasses must have, at temperatures lower than the glass transition temperature, essentially similar thermal expansion coefficients, in order to prevent the cladding from inducing stresses on the core or vice versa while the fiber being drawn cools off. In regard to refractive indexes, they must be such that the numerical aperture allows obtaining cores whose radius is in the required order of magnitude. The numerical aperture is given by NA=$(n_1^2-n_2^2)^{1/2}$, with $n_1$, $n_2$ being the refractive indexes of the core and of the cladding respectively, and it is linked to radius r of the core and to wavelength $\lambda$ by the relation $\lambda=2\pi r \cdot NA/2.405$. Suitable numerical apertures range between 0.3 and 0.5.

Non-oxide glasses which can be used in the presence of an oxide glass cladding can be, for instance, chalcogenide glasses, aluminum fluoride glasses, or phosphate-fluoride glasses.

Examples of chalcogenide glasses which can be used to obtain active fiber optical amplifiers are Ge—S based multicomponent glasses, particularly Ga—Ge—S based glasses such as Ba—Ga—Ge—S, Pb—Ga—Ge—S, As—Ga—Ge—S glasses. Examples of compositions for such glasses are reported in the paper "Rare-earth-doped Multicomponent Ge-based Sulphide Glasses" presented by B. G. Aitken and R. S. Quinby at the 10th International Symposium on Non-Oxide Glasses, Corning, N.Y., USA, 22–24 June 1996. These glasses have glass transition temperatures Tg ranging from a minimum of about 325° C. (for glasses containing As) to a maximum of about 475° C. (for glasses containing Ba), melting temperatures in the order of 700–740° C., thermal expansion coefficients $\alpha$ (for temperatures lower than Tg, particularly temperatures in the range 30 to 300° C.) ranging from a minimum of about $11 \cdot 10^{-6}$ ° $C.^{-1}$ (for glasses containing Ba or As) and a maximum of about $16 \cdot 10^{-6}$ ° C. (for glasses containing As), and refractive index ranging from 2 to about 2.5.

Oxide glasses with glass transition and melting temperatures, thermal expansion coefficients and refractive indexes compatible, for the purposes of the present invention, with those of the aforesaid non-oxide glasses are specifically lead silicate glasses with high lead oxide content, preferably between 30% and 70% (molar percentages), whose refractive index varies from 1.69 to 2.14. In choosing the specific composition it should be kept in mind that glasses whose lead oxide content is close to the upper limits of the range have thermal expansion coefficients which are very similar to those of chalcogenide glasses and refractive indexes yielding the required numerical aperture for the fiber, but they may have excessively low glass transition temperatures. By contrast glasses whose lead oxide content is close to the lower limits of the range have suitable glass transition temperatures but may have excessively low thermal expansion coefficients and refractive indexes. Glasses whose lead oxide content is within the preferred range represent in any case a good compromise solution, also taking into account that any stresses induced in the drawing process can be eliminated with an annealing operation at temperature lower than the glass transition temperature Tg of the core glass.

Alternatively, instead of binary $SiO_2$—PbO glasses, lead silicate glasses also containing minor percentages of additional oxides, e.g. $TiO_2$, can be used. The presence of these additional oxides allows, as is well known to the person skilled in the art, modifying the characteristics of a lead silicate glass in order to obtain the required compatibility of all parameters of interest in the two glasses.

Glasses containing oxides of the $M_2O_5$ type, where M is Nb or Ta, instead of PbO are also suitable. The refractive indexes of said glasses also exceed 2.

Suitable aluminium fluoride glasses are multicomponent glasses, for instance glasses containing, in addition to $AlF_3$, fluorides of alkaline or alkaline-earth metals. By way of example, one can mention glasses whose constituents and the respective percentages are provided in the table which follows (molar percentages):

$AlF_3$ (30–40%) $MgF_2$ (5–12%) $CaF_2$ (15–30%) $SrF_2$ (6–10%) $BaF_2$ (5–10%) LiF (3–12%) NaF (0–12%)

Aluminum fluoride glasses in general have quite a low refractive index (1.44–1.45), so that the oxide glass will generally be a glass based on silica doped with a suitable element which lowers the refractive index, such as F or $B_2O_3$.

The invention also provides a method for the fabrication of the aforesaid fiber, wherein a preform comprising a cladding and a core is drawn, in which the ratio between the diameters corresponds to that required to obtain a single-mode active fiber. According to the invention for preform production an oxide glass capillary tube is used as cladding, into the interior of which there is introduced an element of non-oxide glass, whose melting temperature is lower than that of the oxide glass and lies within the range of softening temperatures of the latter, and, for the drawing process, the preform is brought to a temperature lying within said range and not lower than the melting temperature of the non-oxide glass.

The non-oxide glass element can be introduced into the capillary in its molten state, by capillarity or by pouring, or in its solid state, in the form of a rod.

The non-oxide glass element is conveniently made of a chalcogenide glass, specifically a Ge—S-based multicomponent glass, and preferably a Ga—Ge—S-based glass such as a Ba—Ga—Ge—S, Pb—Ga—Ge—S, As—Ga—Ge—S glass. In this case the oxide glass element can be made of a lead silicate glass with high lead oxide content, preferably between 30% and 70% (molar percentages), or of a glass containing, in addition to silica, $Nb_2O_5$ and $Ta_2O_5$.

As can be clearly seen, with the described method the fiber is obtained either by starting from the non-oxide glass already in its molten state, or by drawing a cold-formed preform. Thus, there is a single high temperature operation on the non-oxide glass and therefore the devitrification risk connected to multiple heating operations to which said glass is subjected using the known methods is essentially eliminated.

The glasses used have preferably melting temperatures (for the non-oxide glass) and softening temperatures (for the oxide glass) ranging between about 700° and 750° C., and such refraction indexes as to give rise, in the drawn fiber, to a numerical aperture ranging between 0.3 and 0.5.

BRIEF DESCRIPTION OF THE DRAWING

The above and other objects, features, and advantages will become more readily apparent from the following description, reference being made to the accompanying drawing in which.

SPECIFIC DESCRIPTION

The first step is fabricating a preform, starting from a lead silicate glass tube 1 (with, for instance, a lead oxide content between 30 and 70%) with a capillary hole 2, destined to form the cladding of the preform. The preform should have, as usual, radial dimensions which are about 100 times larger than those of the final fiber, and therefore the outer diameter of tube 1 should be a the order of ten mm (e.g. 12–20 mm, taking into account that the outer diameter of a single mode fiber is about 125 $\mu$m) and the hole should have a diameter of about 0.2 mm (for a fiber with a core diameter of about 2 $\mu$m). Lead silicate glass (or in general oxide glass) tubes with capillary holes and outer and inner diameters of the order of magnitude indicated are commercially available or can be easily produced, in a way well known to the person skilled in the art.

To form the core, a chalcogenide glass (specifically a Ba—Ga—Ge—S, Pb—Ga—Ge—S, As—Ga—Ge—S glass), previously doped in any suitable way with rare earth metals (e.g. Pr, Dy or Er depending on the intended transmission window) in the amounts required to obtain an optical amplifier, is introduced into the capillary hole 2.

Figure 2:
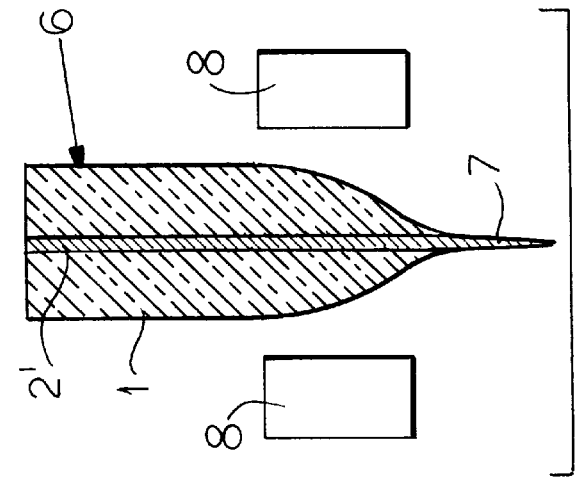
FIG. 2 is a diagrammatic perspective view showing another mode of carrying out an initial part of the method of the invention.
Figure 1:
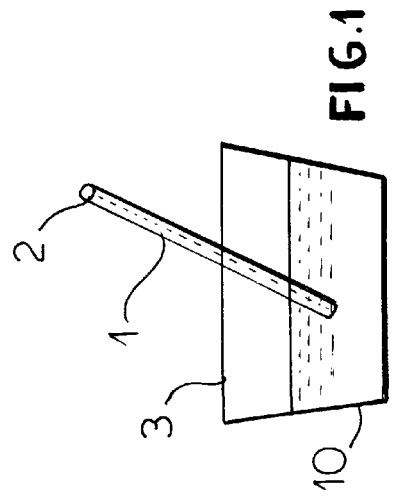
FIG. 1 is a diagrammatic elevational view illustrating one mode of carrying out a part of the method of the invention.

In a first embodiment the chalcogenide glass is melted and introduced into the capillary hole in its molten state. For this purpose, tube 1 can be immersed in a crucible 3 (FIG. 1) containing molten glass 10 and capillarity can be to draw up then melt. Alternatively, as can be seen in FIG. 2, molten glass 10 contained in a crucible again indicated as 3 can be poured into the hole or cavity 2. In this second case it may be convenient for the upper end of tube 1 to present a flare 4; moreover, the lower end of tube 1 can be advantageously connected to an aspiration system, not shown.

Note that the time required for the molten glass to fill by capillarity the cavity of a tube (whose length shall be in the order of a few centimeters) is such that there is no substantial cooling of the glass; yet, it may be useful to pre-heat the tube of lead silicate glass.

Figure 3:
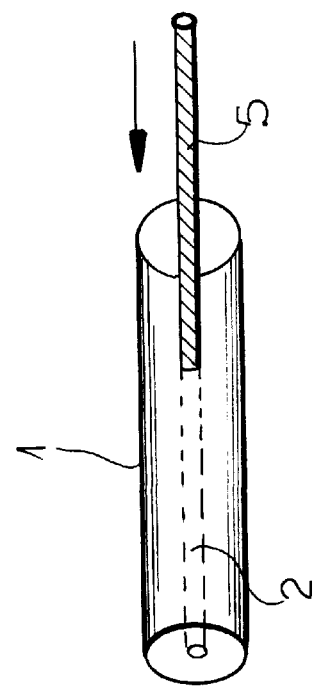
FIG. 3 is a diagrammatic perspective view showing a third mode of carrying out a part of the method of the invention.

In a second embodiment, shown in FIG. 3, a rod 5 of the chalcogenide glass, at ambient temperature, is introduced into hole 2.

Figure 4:
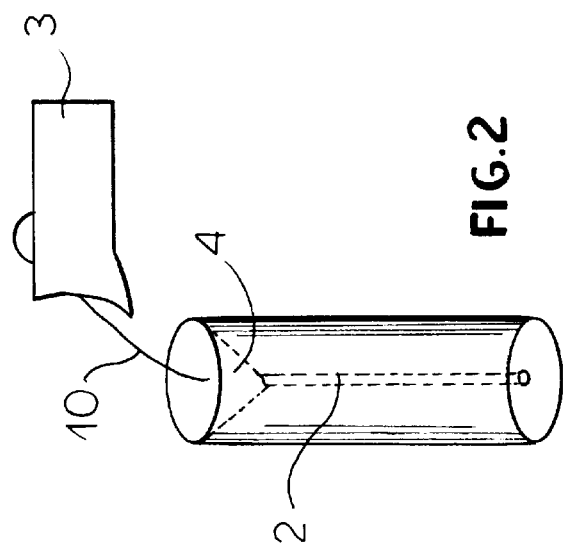
FIG. 4 is a diagrammatic cross sectional view showing another part of the method of the invention.

As a result of the aforesaid operations a preform 6 is obtained, comprising a cladding constituted by tube 1 and a core 2' (FIG. 4). The subsequent operation entails drawing preform 6 to obtain fiber 7. For the drawing operation, the preform is brought to a temperature of the order of 700–750° C. At these temperatures the chalcogenide glasses indicated above melt, whereas the lead silicate glass softens (i.e. its viscosity is between $10^{12}$ Pa·s and $10^4$ Pa·s) and it can be drawn with a force that is the greater as the temperature is closer to the glass transition temperature. Outer tube 1 in practice acts as "container" for the core, and its softening guarantees good uniformity of the cladding-core interface. During the drawing operation, the fiber can be possibly provided external protective coatings. The drawing plant is wholly conventional and the Figure shows only the heating means 8.

If the cooling of the fiber being drawn could give rise to stresses of the core on the cladding or vice versa, for instance because of an excessive difference in the thermal expansion coefficients of the two glasses in the temperature range between the glass transition temperature and ambient temperature, before applying the coating it is also possible to subject the fiber to an annealing operation, at temperatures lower than the glass transition temperature Tg of the chalcogenide glass (about 300° C.).

It is evident that the description above is provided solely by way of non limiting example and that variations and modifications are possible without thereby departing from the scope of the invention.

I claim:

1. A single-mode active optical fiber comprising a core composed of rare-earth-doped non-oxide glass and a cladding composed of oxide glass, the core glass having a melting temperature lower than that of the cladding glass and lying within the range of the softening temperatures of the latter, the range of softening temperatures being the range between the glass transition temperature and a temperature at which the glass has a viscosity of $10^4$ Pa·s.

2. The optical fiber defined in claim 1 wherein the cladding glass and the core glass have reflective indices so as to yield a numerical aperture for the optical fiber between 0.3 and 0.5.

3. A single-mode active optical fiber comprising a core composed of rare-earth-doped non-oxide glass and a cladding composed of oxide glass, the core glass having a melting temperature lower than that of the cladding glass and lying within the range of the softening temperatures of the latter, the range of softening temperatures being the range between the glass transition temperature and a temperature at which the glass has a viscosity of $10^4$ Pa·s, the melting temperature of the core glass and the softening temperature of the cladding glass being of the order of 0.700° C. to 750° C.

4. A single-mode active optical fiber comprising a core composed of rare-earth-doped non-oxide glass and a cladding composed of oxide glass, the core glass having a melting temperature lower than that of the cladding glass and lying within the range of the softening temperatures of the latter, the range of softening temperatures being the range between the glass transition temperature and a temperature at which the glass has a viscosity of $10^4$ Pa·s, the cladding and core glasses having reflective indices so as to yield a numerical aperture of the optical fiber between 0.3 to 0.5, the core being composed of a chalcogenide glass and the cladding being made of a lead silicate glass or an $SiO_2$—$M_2O_5$ glass where M is a metal selected from the group which consists of Nb and Ta.

5. The optical fiber defined in claim 4 wherein the chalcogenide glass is a Ge—S based multicomponent glass.

6. The optical fiber defined in claim 5 wherein the Ge—S based multicomponent glass is a Ga—Ge—S glass.

7. The optical fiber defined in claim 6 wherein the Ga—Ge—S glass is a glass selected from the group which consists of Ba—Ga—Ge—S glass, Pb—Ga—Ge—S glass and As—Ga—Ge—S glass.

8. The optical fiber defined in claim 5 wherein said lead silicate glass is a glass containing 30 to 70 mol-% Pbo.

9. The optical fiber defined in claim 8 wherein the lead silicate glass contains $TiO_2$.

* * * * *